United States Patent
Zhang et al.

(10) Patent No.: US 10,343,635 B2
(45) Date of Patent: Jul. 9, 2019

(54) LOWER GRILLE ASSEMBLY PREVENTING LIGHT LEAKAGE

(71) Applicants: Compagnie Plastic Omnium, Lyons (FR); Yanfeng Plastic Omnium Automotive Exterior Systems Co., Ltd., Jiading District, Shanghai (CN)

(72) Inventors: Xiaoming Zhang, Wuhan (CN); Li Cheng, Wuhan (CN); Wufan Li, Wuhan (CN)

(73) Assignees: Compagnie Plastic Omnium, Lyons (FR); Yanfeng Plastic Omnium Automotive Exterior Systems Co., Ltd., Shanghai (CN)

( * ) Notice: Subject to any disclaimer, the term of this patent is extended or adjusted under 35 U.S.C. 154(b) by 0 days.

(21) Appl. No.: 15/501,966

(22) PCT Filed: Aug. 6, 2015

(86) PCT No.: PCT/CN2015/086285
§ 371 (c)(1),
(2) Date: Mar. 22, 2017

(87) PCT Pub. No.: WO2016/019891
PCT Pub. Date: Feb. 11, 2016

(65) Prior Publication Data
US 2017/0253206 A1    Sep. 7, 2017

(30) Foreign Application Priority Data

Aug. 6, 2014 (CN) .................... 2014 2 0439181 U

(51) Int. Cl.
*B60R 19/52* (2006.01)
*B60R 19/02* (2006.01)
*B60R 19/18* (2006.01)

(52) U.S. Cl.
CPC .............. *B60R 19/52* (2013.01); *B60R 19/02* (2013.01); *B60R 2019/1886* (2013.01); *B60R 2019/527* (2013.01)

(58) Field of Classification Search
CPC ...................................... B60R 19/52
(Continued)

(56) References Cited

U.S. PATENT DOCUMENTS 2,905,286 A * 9/1959 Adams ................... B60R 19/52
180/68.4
6,422,643 B1 * 7/2002 Pease ..................... B60R 19/52
24/297

(Continued)

FOREIGN PATENT DOCUMENTS

| CN | 201559606 U | 8/2010 |
| CN | 103818325 A | 5/2014 |

(Continued)

OTHER PUBLICATIONS

Machine translation of CN '325 (Year: 2014).*
(Continued)

*Primary Examiner* — Hilary L Gutman
(74) *Attorney, Agent, or Firm* — Harness, Dickey & Pierce, P.L.C.

(57) ABSTRACT

A lower grille assembly preventing light leakage and fixedly connected to a bumper skin of a vehicle and comprising a lower grille body with a buckle mounting orifice and a lower grille trim with a buckle, wherein the lower grille trim is fixedly connected to the lower grille body by means of the buckle and the buckle mounting orifice; a buckle flange extending outward on the buckle of the lower grille trim, the buckle including a U-shaped groove for receiving an end of the skin and in a clearance fit with the end, so as to clamp and support the skin, effectively ensuring a Z-direction (Continued)

clearance between the trim and the skin, preventing the skin from falling due to its dead weight, and avoiding light leakage due to an increased Z-direction clearance between the skin and the lower grille assembly resulting from deformation of the lower grille assembly.

6 Claims, 2 Drawing Sheets

(58) Field of Classification Search
USPC .................................................. 296/193.1
See application file for complete search history.

(56) References Cited

U.S. PATENT DOCUMENTS

| | | | | |
|---|---|---|---|---|
| 9,707,916 | B2* | 7/2017 | Mohacsi | B60R 19/52 |
| 2006/0249961 | A1 | 11/2006 | Flotzinger | |
| 2010/0148525 | A1* | 6/2010 | Abdelnour | B60R 19/52 |
| | | | | 293/115 |
| 2010/0176617 | A1* | 7/2010 | Khazaal | B60D 1/56 |
| | | | | 296/1.08 |
| 2013/0221707 | A1* | 8/2013 | Huttenlocher | B60R 19/52 |
| | | | | 296/193.1 |
| 2014/0132033 | A1* | 5/2014 | Townson | B62D 25/084 |
| | | | | 296/193.1 |

FOREIGN PATENT DOCUMENTS

| | | |
|---|---|---|
| CN | 204095732 U | 1/2015 |
| DE | 102006016017 A1 | 10/2007 |
| FR | 2929205 A1 | 10/2009 |
| JP | 2009035032 A | 2/2009 |

OTHER PUBLICATIONS

International Search Report PCT/ISA/210 for International Application No. PCT/CN2015/086285 dated Oct. 21, 2015.
International Preliminary Report on Patentability dated Feb. 7, 2017 for corresponding application PCT/CN2015/086285 and English translation thereof.
Supplementary European Search Report for corresponding European Application No. 15829042.9 dated Feb. 5, 2018.

* cited by examiner

LOWER GRILLE ASSEMBLY PREVENTING LIGHT LEAKAGE

CROSS-REFERENCE TO RELATED APPLICATIONS

This application is the U.S. National Phase application of PCT Application No. PCT/CN2015/086285 filed on Aug. 6, 2015, which claims priority to Chinese Application No. 201420439181.3 filed on Aug. 6, 2014, the contents of each of which are incorporated herein by reference in their entirety.

FIELD OF INVENTION

The present invention relates to vehicle front bumpers, and more particularly to a lower grille assembly preventing light leakage in a front bumper.

BACKGROUND

FIGS. 1 and 2 illustrate schematic views of a vehicle front bumper assembly from the prior art, which comprises a lower grille body 1' with a buckle mounting orifice 11', a lower grille trim 2' with a buckle 21', and a skin 3'. During the assembly, first, the lower grille trim 2' is fixedly connected to the lower grille body 1' by means of the buckle 21' and the buckle mounting orifice 11' so as to form a lower grille assembly; and then the lower grille assembly is fixedly connected with the skin 3' along the X direction (namely, from rear to front).

However, in order to avoid interference with the buckle 21' of the lower grille trim 2', the skin 3' needs to be provided with a notch corresponding to the buckle 21', in such a way that the overlapping portion between the skin 3' and the lower grille trim 2' aims at being minimum in the avoiding area, thereby leading to a risk of light leakage and affecting the appearance.

To solve the problem of light leakage between the lower grille trim 2' and the skin 3', the prior art prevents a light leakage mainly by improving the manufacturing and assembling precision so as to reduce the clearance between the trim 2' and the skin 3' in the Z direction. However, it should be understood that a too small clearance could lead the surface of the trim 2' to the risk of being scratched by the skin 3' when the lower grille assembly is assembled from back to front.

SUMMARY

To overcome the defects of the prior art, the present invention provides a lower grille assembly preventing light leakage in the premise of effectively ensuring the required Z-direction clearance between the lower grill trim and the skin.

For this purpose, the present invention adopts the following technical solutions:

A lower grille assembly preventing light leakage, being fixedly connected to a bumper skin of a vehicle and comprising a lower grille body with a buckle mounting orifice and a lower grille trim with a buckle, wherein the lower grille trim is fixedly connected to the lower grille body by means of the buckle and the buckle mounting orifice, A buckle flange is provided on the buckle of the lower grille trim, such that the buckle is formed to comprise a U-shaped groove for receiving an end of the skin, wherein the end of the skin has a clearance fit with the U-shaped groove.

Preferably, the clearance between the buckle flange and the lower grille body is not less than 1.0 mm.

Preferably, the minimum clearance between the buckle flange and the skin is 0.3 mm-0.5 mm.

Advantageously, the wall thickness of the buckle flange is not less than 2.0 mm.

Advantageously, the overlap between the buckle flange and the skin is not less than 3.0 mm.

The lower grille assembly of the present invention can prevent light leakage by ensuring the required Z-direction clearance between the lower grill trim and the skin. In addition, the present invention has a simple structure and is easy to assemble. There is no need to change the overall configuration of the lower grille assembly and the sequence of assembling.

DESCRIPTION OF EMBODIMENTS

The preferred embodiment of the present invention will be described in details with reference to the drawings.

Figure 1:
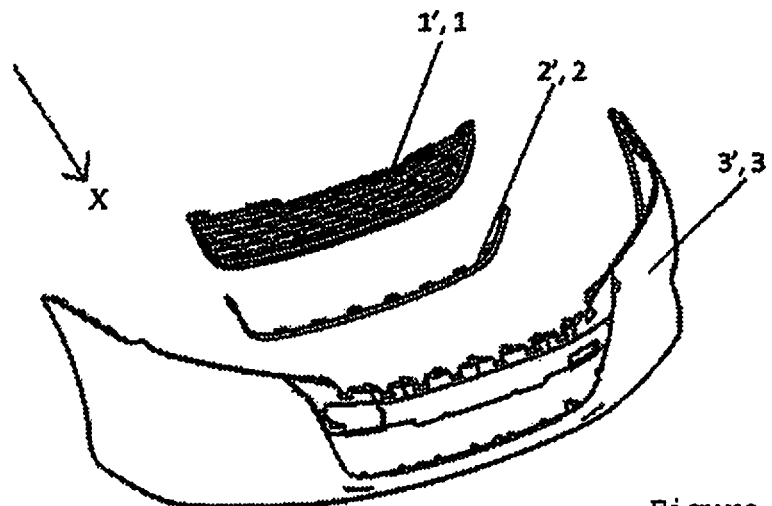
FIG. 1 is an overall structural schematic view of a vehicle front bumper assembly of the prior art and adapted to the present invention.

As shown in FIG. 1, a vehicle front bumper assembly of the present invention also comprises a lower grille body 1, a lower grille trim 2 and a skin 3.

Figure 2:
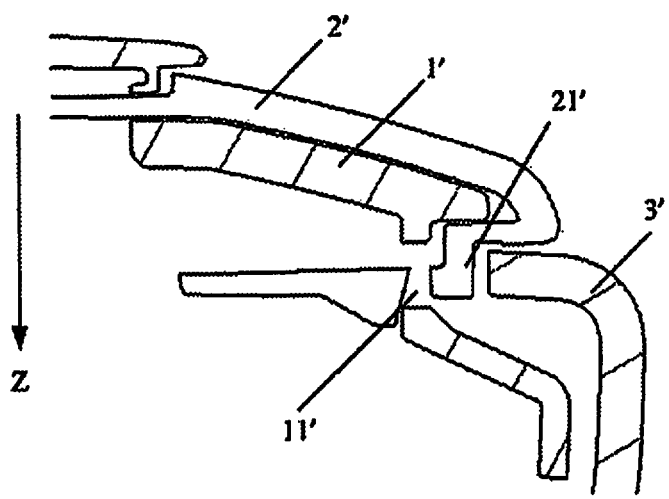
FIG. 2 is a cross-sectional schematic view of the vehicle bumper assembly of FIG. 1, which illustrates the positional relationship between a lower grille body, a lower grille trim and a skin of the prior art.
Figure 3:
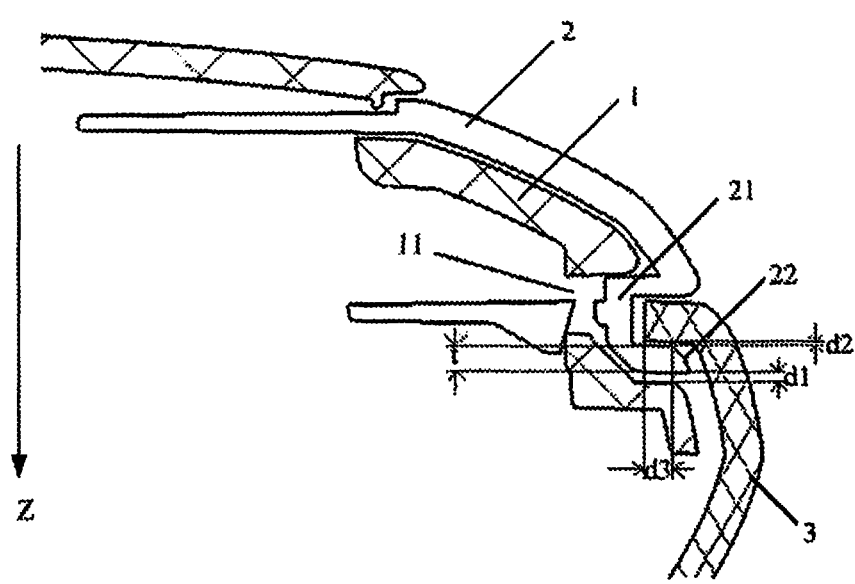
FIG. 3 is a cross-sectional schematic view of the vehicle bumper assembly of FIG. 1, which illustrates the positional relationship between a lower grille body, a lower grille trim and a skin according to the present invention.

In relation with FIGS. 1 and 3, the lower grille assembly of the present invention comprises a lower grille body 1 with a buckle mounting orifice 11 and a lower grille trim 2 with a buckle 21. Similar to the prior art as shown in FIG. 2, the lower grille trim 2 is fixedly connected to the lower grille body 1 through the buckle 21 and the buckle mounting orifice 11; and different from the prior art, a buckle flange 22 extending outward is provided on the buckle 21 of the lower grille trim 2, such that the buckle 21 is formed to comprise a U-shaped groove for receiving an end of the skin 3 and with a clearance fit with the end, so as to clamp and support the skin 3, thereby effectively ensuring a Z-direction clearance between the trim and the skin 3, preventing the skin 3 from falling due to its dead weight, and avoiding a serious light leakage due to an increased Z-direction clearance between the skin 3 and the lower grille assembly resulting from deformation of the lower grille assembly.

Consequently, the lower grille assembly of the present invention is able to prevent light leakage by ensuring the required Z-direction clearance between the lower grill trim 2 and the skin 3. In addition, the present invention has a simple structure and is easy to assemble. There is no need to change the overall configuration of the lower grille assembly and the sequence of assembling.

Additionally, in the preferred embodiment as shown in FIG. 3, the clearance d1 between the buckle flange 22 and the lower grille body 1 is not less than 1.0 mm, the minimum Z-direction clearance d2 between the buckle flange 22 and the skin 3 is 0.3 mm-0.5 mm, the wall thickness t of the buckle flange 22 is not less than 2.0 mm, and the overlap d3 between the buckle flange 22 and the skin 3 is not less than 3.0 mm.

The above contents are merely preferred embodiments of the present invention and not intended to limit the scope of the present invention. Variations can be made to the above embodiments of the present invention. Any simple and equivalent variation and modification made according to the claims and description of the present invention falls within the protection scope of the claims of the present invention.

The invention claimed is:

1. A lower grille assembly configured to reduce light leakage, the lower grille assembly being fixedly connected to a bumper skin of a vehicle and comprising:
 a lower grille body defining a buckle mounting orifice; and
 a lower grille trim including a buckle,
 wherein the lower grille trim is fixedly connected to the lower grille body by the buckle and the buckle mounting orifice,
 wherein the buckle includes a buckle flange and defines a U-shaped groove configured to receive an end of the bumper skin, the end of the bumper skin having a clearance fit with the U-shaped groove, independently of the lower grille trim being fixedly connected to the lower grille body, such that
  the lower grille trim isolates the end of the bumper skin from direct contact with the lower grille body, and
  the lower grille trim clamps and supports the bumper skin to prevent the bumper skin from falling due to a dead weight of the bumper skin;
 wherein at least one of:
  a wall thickness of the buckle flange is not less than 2.0 mm; and
  an overlap between the buckle flange and the bumper skin is not less than 3.0 mm.

2. The lower grille assembly according to claim 1, wherein a clearance between the buckle flange and the lower grille body is not less than 1.0 mm.

3. The lower grille assembly according to claim 1, wherein a minimum clearance between the buckle flange and the bumper skin is 0.3 mm-0.5 mm.

4. A grille assembly for a vehicle, the grille assembly comprising:
 a lower grille trim including a U-shaped buckle, the U-shaped buckle including a buckle flange; and
 a lower grille body defining a buckle mounting orifice, the U-shaped buckle at least partly fitting in the buckle mounting orifice so that the lower grille trim is fixedly connected to the lower grille body;
 wherein the U-shaped buckle is configured to receive an end of a bumper skin, the end of the bumper skin being at least partly secured by the buckle flange, independently of the lower grille trim being fixedly connected to the lower grille body, such that
  the lower grille trim isolates the end of the bumper skin from direct contact with the lower grille body, and
  the lower grille trim clamps and supports the bumper skin to prevent the bumper skin from falling due to a dead weight of the bumper skin;
 wherein at least one of:
  a wall thickness of the buckle flange is not less than 2.0 mm; and
  an overlap between the buckle flange and the bumper skin is not less than 3.0 mm.

5. A lower grille assembly configured to reduce light leakage, the lower grille assembly being fixedly connected to a bumper skin of a vehicle and comprising:
 a lower grille body defining a buckle mounting orifice; and
 a lower grille trim including a buckle,
 wherein the buckle engages with the buckle mounting orifice so that the lower grille trim is fixedly connected to the lower grille body,
 wherein the buckle includes a buckle flange and defines a U-shaped groove configured to receive an end of the bumper skin, the end of the bumper skin having a clearance fit with the U-shaped groove, independently of the lower grille trim being fixedly connected to the lower grille body, such that
  the lower grille trim isolates the end of the bumper skin from direct contact with the lower grille body, and
  the lower grille trim clamps and supports the bumper skin to prevent the bumper skin from falling due to a dead weight of the bumper skin; and
 wherein the buckle and the buckle flange are integrated as one single portion in a same transverse position on the lower grille trim.

6. The lower grille assembly according to claim 5, wherein the buckle mounting orifice is a through opening.

* * * * *

UNITED STATES PATENT AND TRADEMARK OFFICE
CERTIFICATE OF CORRECTION

PATENT NO. : 10,343,635 B2  
APPLICATION NO. : 15/501966  
DATED : July 9, 2019  
INVENTOR(S) : Xiaoming Zhang et al.

Page 1 of 1

It is certified that error appears in the above-identified patent and that said Letters Patent is hereby corrected as shown below:

On the Title Page

(71) Applicants correct the city to read: Compagnie Plastic Omnium, Lyon (FR)

(73) Assignees correct the city to read: Compagnie Plastic Omnium, Lyon (FR)

Signed and Sealed this  
Twenty-sixth Day of May, 2020

Andrei Iancu  
*Director of the United States Patent and Trademark Office*